(12) United States Patent
Morales

(10) Patent No.: US 7,075,276 B2
(45) Date of Patent: Jul. 11, 2006

(54) ON-CHIP COMPENSATION CONTROL FOR VOLTAGE REGULATION

(75) Inventor: Louis J. Morales, Sommerville, MA (US)

(73) Assignee: ISINE, Inc., Boston, MA (US)

( * ) Notice: Subject to any disclaimer, the term of this patent is extended or adjusted under 35 U.S.C. 154(b) by 219 days.

(21) Appl. No.: 10/613,969

(22) Filed: Jul. 3, 2003

(65) Prior Publication Data
US 2005/0001600 A1 Jan. 6, 2005

(51) Int. Cl.
*G05F 1/40* (2006.01)
(52) U.S. Cl. .................. 323/246; 363/147; 327/156
(58) Field of Classification Search ................ 323/280, 323/281, 283, 284, 285, 241, 246; 327/147, 327/156, 538; 375/376; 365/229; 363/147
See application file for complete search history.

(56) References Cited

U.S. PATENT DOCUMENTS 5,404,250 A * 4/1995 Hase et al. .................... 331/17
6,316,987 B1 * 11/2001 Dally et al. .................. 327/538
2002/0101947 A1 * 8/2002 Sumiyoshi .................. 375/376

\* cited by examiner

*Primary Examiner*—Jessica Han
(74) *Attorney, Agent, or Firm*—Werner & Axenfeld, PC

(57) ABSTRACT

Manufacturing and/or operational variations that affect performance of an integrated circuit (IC) are at least partially compensated for, by determining the magnitude of these variations and providing one or more corresponding control signals to a voltage regulator, which, responsive thereto, increases or decreases the magnitude of the output voltage. The output voltage of the voltage regulator is typically provided to a power supply node of the IC. Similarly, the output of the voltage regulator may be provided to a substrate portion of the IC, so as to provide a substrate bias that is variable in response to changes in the performance of the IC. In various embodiments, a determination of the magnitude of the variations is made by comparing the performance of a digital delay circuit or a ring oscillator to a reference clock; speed characterization of the IC may be obtained from the voltage regulator control signals; and information regarding reliability degradation of the IC may be obtained from the control signals that are generated for control of the voltage regulation circuitry.

6 Claims, 4 Drawing Sheets

Analog Block Diagram - circuit type 1

Analog Block Diagram - circuit type 2

ON-CHIP COMPENSATION CONTROL FOR VOLTAGE REGULATION

FIELD OF THE INVENTION

The present invention relates generally to electronic circuits for voltage regulation, and more particularly relates to providing control information to a voltage regulator based upon manufacturing or operational characteristics of an integrated circuit that receives the regulated voltage output of a voltage regulator.

BACKGROUND

Advances in semiconductor manufacturing technology have resulted in ever decreasing physical dimensions for the various circuit elements, such as, for example, field effect transistors, which are used in forming integrated circuits. In turn, the smaller dimensions of such circuit elements have allowed the integration onto a single chip of many more transistors than was possible in the past.

As is well-known in the field of integrated circuits, reducing the dimensions of circuit elements generally, and of the field effect transistor (FET) in particular, requires a corresponding reduction in the power supply voltage in order to avoid electric field strengths within the integrated circuit which might result in dielectric breakdown, or other adverse effects. Additionally, transistors of such small dimensions tend to have significant leakage current, or sub-threshold conduction. Therefore to maintain the power consumption of integrated circuits having a very large number of small, i.e., "leaky", transistors at a reasonable level, it has become common to reduce the power supply voltage.

It can be readily understood that a given fluctuation, or variation, in the power supply voltage will result in a larger percentage change in the power supply as the nominal value of the power supply voltage is decreased. For example, a −0.5 volt change in a power supply output voltage having a nominal value of 5 volts is a −10% change, whereas the same −0.5 volt change in a power supply output voltage having a nominal value of 1.5 volts is a −33% change. In other words, as power supply voltages for integrated circuits have decreased, the importance of maintaining a well-regulated power supply voltage has increased. In response thereto a number of voltage regulation strategies and products have been developed.

Although conventional power supply voltage regulation schemes have been developed, such schemes generally address the maintenance of a particular, that is, fixed, nominal voltage at the output of a voltage regulator.

What is needed are methods and apparatus for providing flexible and responsive voltage regulation for integrated circuits.

SUMMARY OF THE INVENTION

Figure 1:
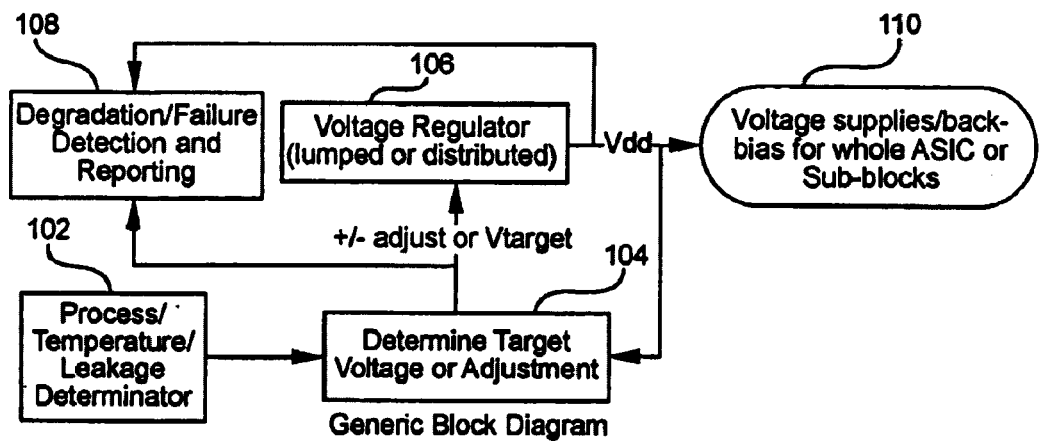
FIG. 1 is a high-level block diagram of the present invention which indicates the relationship between determining chip specific conditions that affect performance, determining the magnitude of an adjustment to be made to a power supply voltage, regulating a power supply so as to change the nominal power supply voltage, delivering regulated voltages, and reporting degradation or failure modes.

Briefly, manufacturing and/or operational variations that affect the performance of an integrated circuit are at least partially compensated for, by determining the magnitude of these variations and providing one or more corresponding control signals to power supply voltage regulation circuitry, which, responsive thereto, increases or decreases the magnitude of the output voltage of the regulator. The power supply voltage output of the voltage regulation circuitry is typically provided to a power supply node of an integrated circuit. Similarly, the power supply voltage output of the voltage regulation circuitry may be provided, directly or indirectly, to a substrate portion of an integrated circuit, so as to provide a substrate bias that is variable in response to changes in the performance of the integrated circuit.

In a further aspect, a determination of the magnitude of the variations is made by comparing the performance of a digital delay circuit to a reference clock.

In a still further aspect, a determination of the magnitude of the variations is made by comparing the performance of a ring oscillator circuit to a reference clock.

In a still further aspect, speed characterization information of an integrated circuit may be obtained from the control signals that are nominally generated for control of the voltage regulation circuitry.

In a still further aspect, information regarding reliability degradation of the integrated circuit may be obtained from the control signals that are nominally generated for control of the voltage regulation circuitry.

DETAILED DESCRIPTION

Various embodiments of the present invention provide control information to a voltage regulator in order to modify, or adjust, the nominal output voltage of such a regulator. These modifications to the nominal output voltage are generally made so as to compensate for manufacturing and/or operational characteristics. In typical embodiments of the present invention, an integrated circuit, which is coupled to receive the regulated output voltage, is "instrumented" so as to provide feedback to the voltage regulator. By way of example, and not limitation, an integrated circuit having transistor performance at the low end of the current-drive range for a particular semiconductor manufacturing process may command the voltage regulator to increase the power supply voltage so as to increase the desired speed of operation. Similarly, if the operational characteristics of the integrated circuit are adversely impacted by ambient temperature, then the control information may command the voltage regulator to adjust the nominal output voltage thereof to compensate for a temperature induced performance variation.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

Terminology

"ASIC" refers to Application Specific Integrated Circuit. "SoC" refers to a System on a Chip, with "SoCs" being the plural of SoC. A SoC may be an ASIC but is not required to be. An ASIC may be a SoC but is not required to be.

The expression "back bias", as used herein, refers to a voltage applied to the substrate, or body, of a field effect transistor (FET). Back bias is alternatively referred to as substrate bias, or reverse bias.

The terms chip, semiconductor device, integrated circuit, LSI device, monolithic integrated circuit, ASIC, SoC, microelectronic device, and similar expressions are sometimes used interchangeably in this field. Microelectronic device may be considered to be the broadest term, encompassing the others. With respect to these microelectronic devices, signals are typically coupled between them and other circuit elements via physical, electrically conductive connections. The point of connection is sometimes referred to as an input, output, terminal, line, pin, pad, port, interface, or similar variants and combinations.

The term "device", as used herein, refers to one or more circuit elements that have characteristics that are voltage variant. "Device" includes, but is not limited to, FETs (n-channel and p-channel), diodes, and varactors.

FET as used herein, refers to metal-oxide-semiconductor field effect transistors (MOSFETs). These transistors are also known as insulated gate field effect transistors (IGFETs). FETs are generally described as three terminal devices having a gate, a source and a drain. Although FETs may be further described as four terminal devices when the body of the FET is considered.

Source and drain terminals refer to the terminals of a FET, between which conduction occurs under the influence of an electric field, subsequent to the inversion of the semiconductor surface under the influence of an electric field resulting from a voltage applied to the gate terminal. Generally, the source and drain terminals are fabricated such that they are geometrically symmetrical. With geometrically symmetrical source and drain terminals it is common to simply refer to these terminals as source/drain terminals. Designers often designate a particular source/drain terminal to be a "source" or a "drain" on the basis of the voltage to be applied to that terminal when the FET is operated in a circuit.

The acronym JTAG refers to the Joint Test Action Group. The acronym JTAG is typically used in this field to refer to methods and circuitry for testing integrated circuits that comply with the specification of a particular standard. The Institute of Electrical and Electronic Engineers (IEEE) has approved IEEE Standard 1149.1, Test Access Port and Boundary Scan Architecture.

Figure 2:
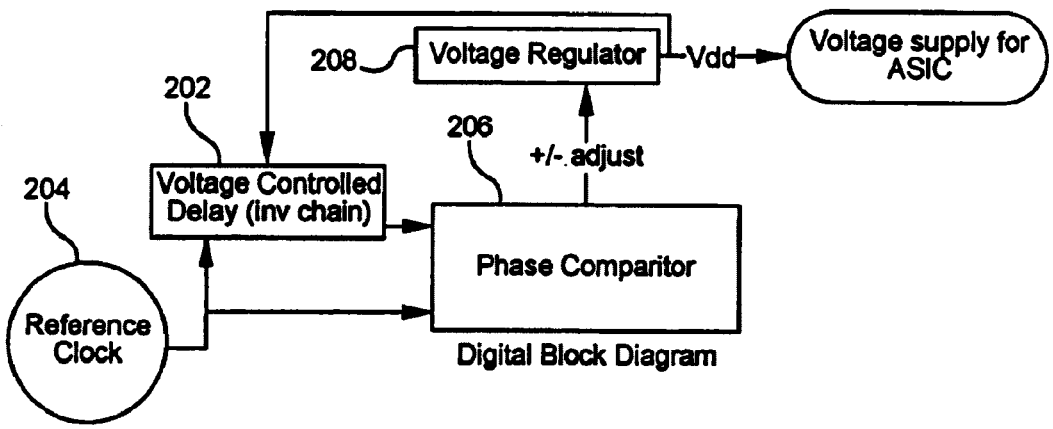
FIG. 2 is a high-level block diagram of a digital implementation of a regulation scheme in accordance with the present invention.
Figure 3:
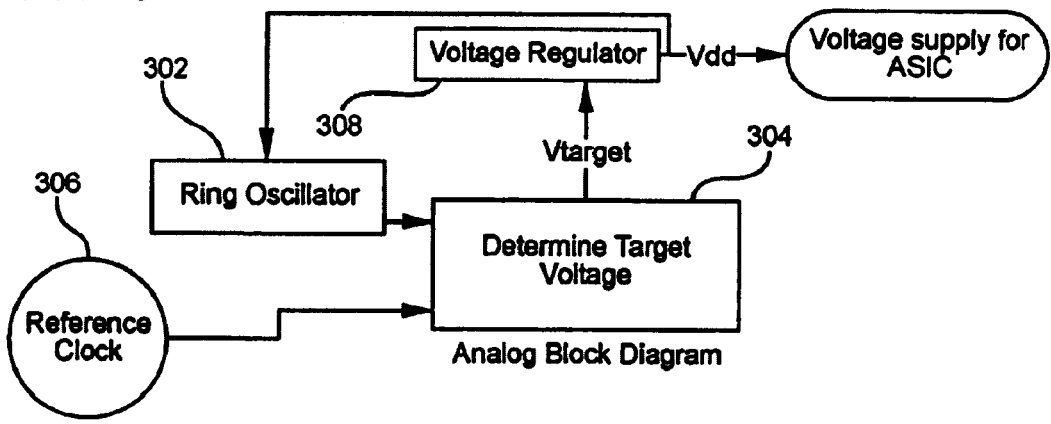
FIG. 3 is a high-level block diagram of an analog implementation of a regulation scheme in accordance with the present invention.

FIGS. 1–3 show high-level illustrative block diagrams of, respectively, a generic implementation, a digital implementation, and an analog implementation of the present invention.

Referring to FIG. 1, a high-level block diagram of the present invention shows the relationship between determining chip specific conditions that affect performance, determining the magnitude of an adjustment to be made to a power supply voltage, regulating a power supply so as to change the nominal power supply voltage, delivering regulated voltages, and reporting degradation or failure modes. More particularly, a circuit 102 disposed on an integrated circuit, determines one or more characteristics of that integrated circuit which affect its speed of operation and/or its power consumption. For example, as is known in the semiconductor field, variations in an integrated circuit manufacturing process may result in differences in speed performance between chips of the same design. These variations can exist between different chips of the same design which are formed on a single wafer, between such chips from different wafers in the same manufacturing batch, and between such chips from different manufacturing batches. While some of these manufacturing variations may affect circuit switching speed, others may affect leakage current within the integrated circuit. Similarly, variations in speed performance may result from changes in the temperature of the integrated circuit while it is being operated. It is noted that various embodiments of the present invention use the information determined by circuit 102 regarding speed and/or leakage, in generating control information which adjusts the power supply voltage to at least partially compensate, or adjust, the performance of the integrated circuit. A circuit 104 is coupled to circuit 102 to receive information regarding performance variations from nominal. Circuit 104, based on the information received from circuit 102, produces control information that is provided to a voltage regulator 106 for adjusting the output voltage of regulator 106. The control information produced by circuit 104 may be in the form of information that specifies a target output voltage for regulator 106, or it may be in the form of information that instructs regulator 106 to increase or decrease its output voltage by a particular amount. As shown in FIG. 1, the output of regulator 106 is labelled Vdd. The supply voltage, Vdd, is provided to one or more power supply nodes within the integrated circuit that includes circuit 102, as indicated by block 110.

Still referring to FIG. 1, a circuit block 108, which is coupled to circuit 104, monitors the magnitude of the voltage adjustments specified by circuit 104. Circuit block 108 determines, typically by comparison to a predetermined threshold, whether the voltage adjustments specified by circuit 104 indicate that the reliability of the integrated circuit has degraded. In other words, if the integrated circuit requires a change to its power supply voltage greater than some threshold amount in order to bring its performance closer to its intended operating range, then that integrated circuit may have degraded for some reason, and is potentially in need of replacement. Circuit 108 then generates one or more signals that indicate to a user, or a system management device or process, that service attention is advisable. Such signals may be provided at an output terminal, or may be stored on-chip and queried by a management device or process. In alternative arrangements, an interrupt signal may be generated by circuit 108 by which a microprocessor, or similar device, may be alerted to the need for service. In still further alternative arrangements, the voltage adjustments specified by circuit 104 are monitored and tracked over time by circuit 108, and the decision to request service is based not only on an excursion beyond the predetermined threshold, but also upon the number of excursions, or the length of time of those excursions. In still further alternative arrangements a log, or history, of the voltage adjustments are kept by circuit 108.

In still further alternative arrangements, the predetermined threshold value itself is dynamically adjusted. This dynamic adjustment of the predetermined threshold value may be based on a variety of factors, such as, but not limited to, the ambient temperature in which the integrated circuit operates, the junction temperatures on the integrated circuit, or a particular class of operations that the integrated circuit performs. In other words, operation at higher temperatures tends to slow down integrated circuit operation, which in turn, would result in the control circuitry of the present invention commanding the voltage regulator to increase the supply voltage to the positive rail. However, without knowledge of the fact that the integrated circuit has been operating in a high temperature regime, circuit block 108 could mistakenly characterize the extended requests for higher operating voltages as a degradation in performance or reliability which requires service. In such alternative arrangements, additional information may be collected to facilitate decision making regarding which of a plurality of threshold values should be used. For example, a temperature measurement, obtained from any suitable source including but not limited to a thermocouple, may be used to facilitate decision making with respect to whether a requested change to the nominal output of the voltage regulator should be considered an excursion from a normal range of adjustments. Such temperature measurements may be made of, for example, the ambient temperature in which the integrated circuit is operating, or of the junction temperature of the integrated during the operation thereof.

In a similar manner, a particular class of operations within the integrated circuit may require adjustment to the nominal voltage that is output by the voltage regulator to correct for a deficiency in a particular speed path. In this way, for example, a voltage boost resulting in a power consumption spike, is only introduced when a particular operation, or set of operations is attempted by the integrated circuit.

FIG. 2 shows a high-level block diagram of an illustrative digital implementation of a voltage regulation scheme in accordance with the present invention. More particularly, a voltage controlled delay circuit 202 is coupled to receive a reference clock signal from a reference clock signal source 204. In this illustrative embodiment, voltage controlled delay circuit 202 is an inverter chain. Voltage controlled delay circuit 202 has a positive voltage supply rail that is coupled to the output terminal of a voltage regulator 208. The output of voltage regulator 208 is labelled Vdd in FIG. 2. A phase comparator 206 is coupled to receive the reference clock signal from reference clock signal source 204, and to further receive an output signal from voltage controlled delay circuit 202. Phase comparator 206 is adapted to determine a phase difference, or delay, between the reference clock signal and the output of voltage controlled delay circuit 202. Based upon the determination of the phase difference between the reference clock signal and the output of voltage controlled delay 202, phase comparator 206 provides a control signal to voltage regulator 208. This control signal is used to increase or decrease the voltage that is output by voltage regulator 208. In this illustrative embodiment, the control signal indicates that the output voltage of voltage regulator 208 is to be increased when the inverter chain is too slow, and decreased when the inverter chain is too fast. Since the speed of the inverter chain is related to Vdd, the phase difference changes as the output voltage of voltage regulator 208 is changed. Within the scope of the present invention, the determination of "too fast" and "too slow" is based, at least in part, on the phase difference between the reference clock signal and the output of the voltage controlled delay circuit 202, and therefore the determination can be fixed or programmable by comparing the detected phase difference to either fixed or programmable values. Programmable values may be stored in any suitable memory means, either volatile or non-volatile. It will be appreciated that phase comparator 206 may communicate with voltage regulator 208 in any suitable signal format, and that the present invention is not limited to any particular signalling format or protocol.

FIG. 3 is a high-level block diagram of an analog implementation of a voltage regulation scheme in accordance with the present invention. More particularly, a ring oscillator 302 receives its positive voltage supply from the output of a voltage regulator 308. Ring oscillator 302 provides an output signal to a circuit 304. Circuit 304 also receives a reference clock signal from a reference clock source 306. Based on the reference clock signal and the output of ring oscillator 302, circuit 304 determines the desired output voltage target for regulator 308. The embodiment shown in FIG. 3 is similar to that shown in FIG. 2, except that a ring oscillator, which has a frequency that is dependent upon Vdd, is used rather than an inverter chain, in making the determination of an appropriate output voltage to be produced by voltage regulator 308.

Figure 4:
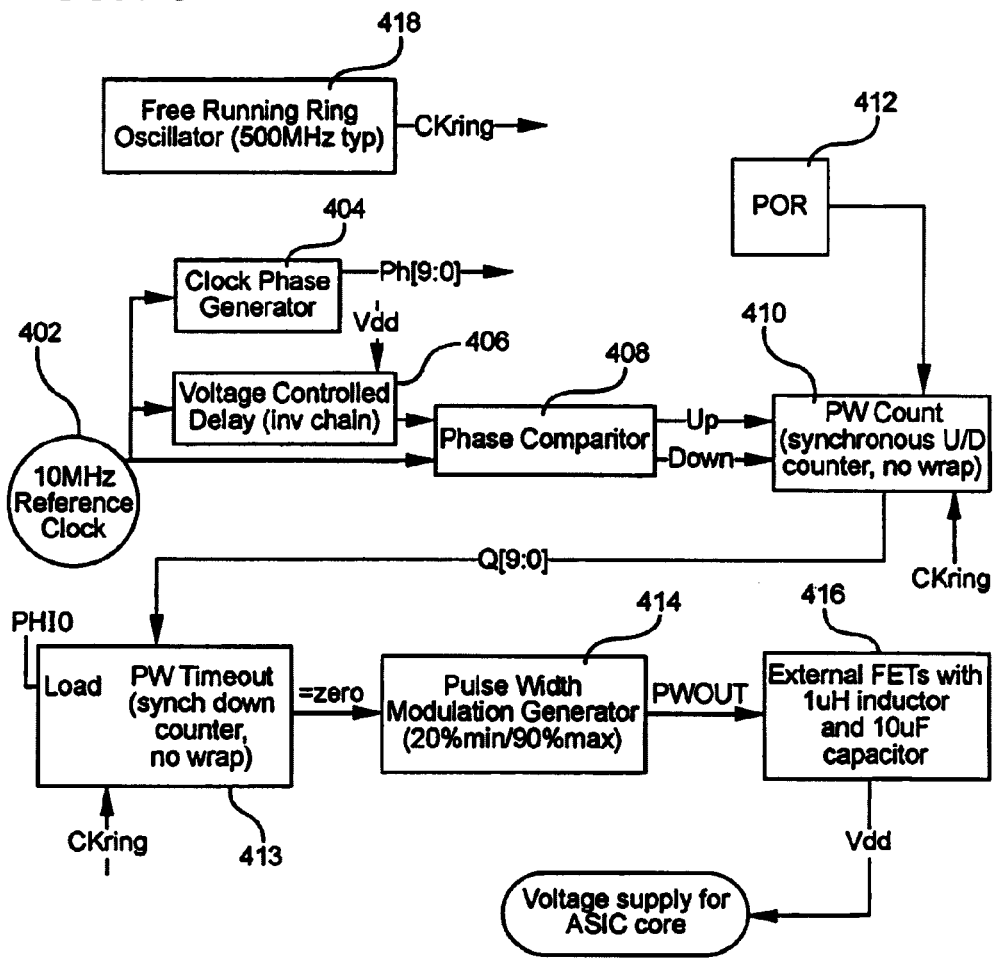
FIG. 4 is a detailed block diagram of a digital implementation of a regulation scheme in accordance with the present invention.

FIG. 4 shows a detailed block diagram of an illustrative digital implementation of a regulation scheme in accordance with the present invention in which Vdd (i.e., the output of the voltage regulator) is nominally 1.8 volts, and all the circuit blocks in this illustrative implementation are coupled to a positive supply rail nominally set to 3.3 volts, except for a voltage controlled delay circuit which has a positive supply rail coupled to Vdd. More particularly, a 10 MHz reference clock source 402 provides a reference clock signal that is coupled to a clock phase generator 404, a voltage controlled delay circuit 406, and a phase comparator 408. Clock phase generator 404, generates a plurality of clock phase signals, labelled Phi[9:0], which it derives from the 10 MHz reference clock source 402. Clock phase generator 404, as shown in this illustrative embodiment, may also provide clock, or timing, signals for a plurality of circuits and functions unrelated to the present invention. Voltage controlled delay circuit 406, as indicated above, is coupled to Vdd. The switching speed of delay circuit 406, and consequently the delay therethrough, is related to the magnitude of the voltage coupled to its positive supply rail. Phase comparator 408, in this illustrative embodiment, produces a first control signal, and a second control signal, respectively labelled Up and Down. The control signals Up and Down are coupled to a Pulse Width Count circuit 410, which is implemented as a synchronous Up/Down counter with no wrapping. Pulse Width Count circuit 410 is also coupled to receive a reset signal from a power-on reset (POR) circuit 412, so that the counter starts from a known state after reset. Pulse Width Count circuit 410 is further coupled to receive a clock signal, CKring, which is the output of a free running ring oscillator 418. In a typical embodiment, ring oscillator 418 has a frequency of approximately 500 MHz. It is noted that the present invention is not limited to any particular frequency of operation for ring oscillator 418.

Figure 7:
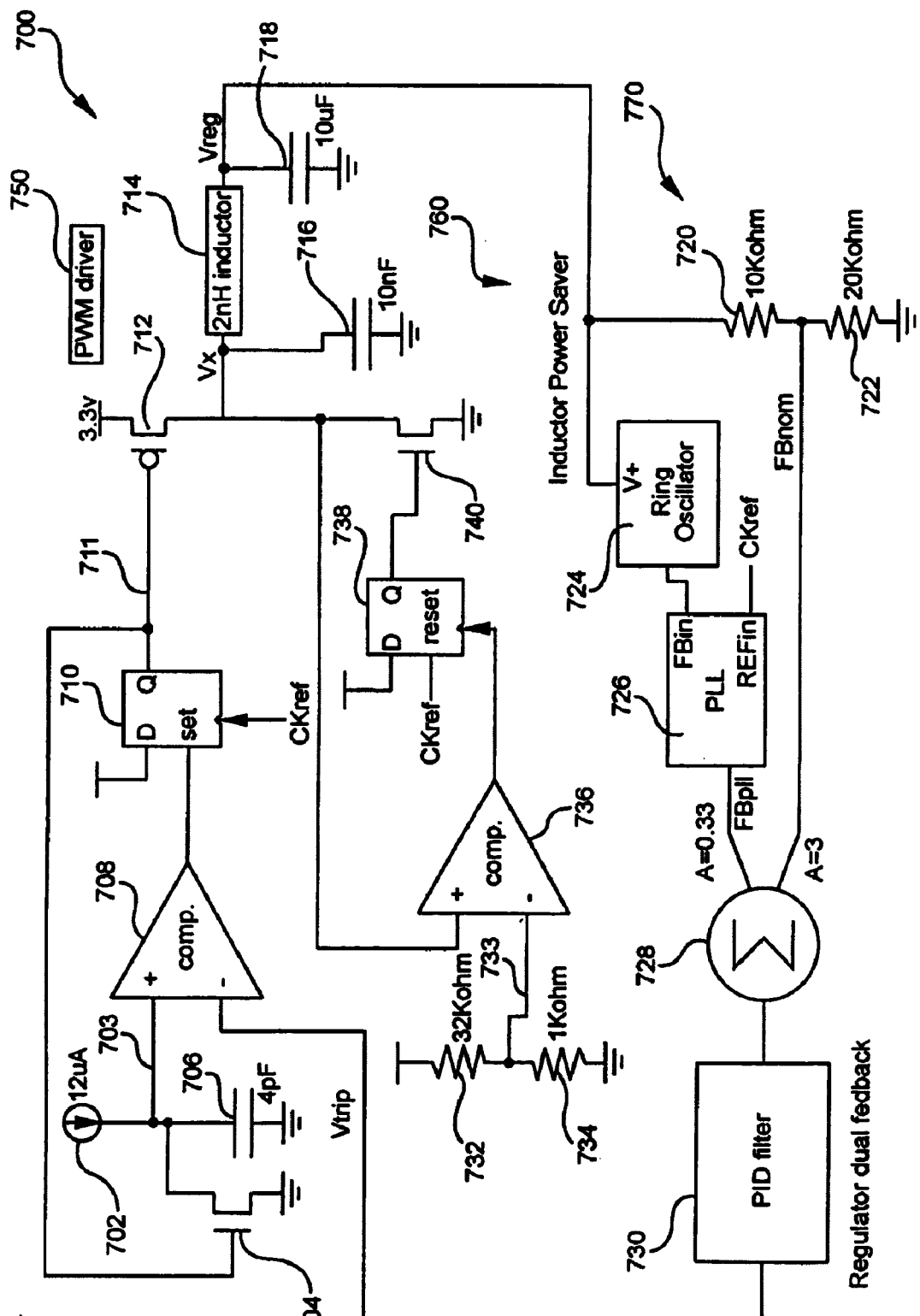
FIG. 7 is a circuit schematic of an analog implementation of a regulation scheme including dual feedback paths in accordance with the present invention.

Still referring to FIG. 4, a Pulse Width timeout circuit 413, which is implemented as a synchronous down counter, with no wrapping, is coupled to receive the counter output of Pulse Width Count circuit 410. Pulse Width timeout circuit 413 is coupled to receive a clock phase signal, Phi0, from clock phase generator 404. The signal Phi0 is coupled to the parallel load control input terminal of Pulse Width timeout circuit 413 and is used to load, or reload, Pulse Width timeout circuit 413 with the contents of Pulse Width Count circuit 410. Pulse Width timeout circuit 413 is further coupled to receive the clock signal, CKring, from ring oscillator 418. Pulse Width timeout circuit 413 provides as an output signal which indicates when the counter value reaches, or equals, zero. This "equals zero" signal is provided to a Pulse Width Modulation Generator 414. Pulse Width Modulation Generator 414 produces an output signal, labelled PWOUT in FIG. 4, which is the pulse width modulated output signal supplied to an external circuit 416 for producing the final Vdd output. Such an external circuit is shown in FIG. 7, and includes circuit elements such as capacitors having large capacitance values, and an inductor.

Figure 5:
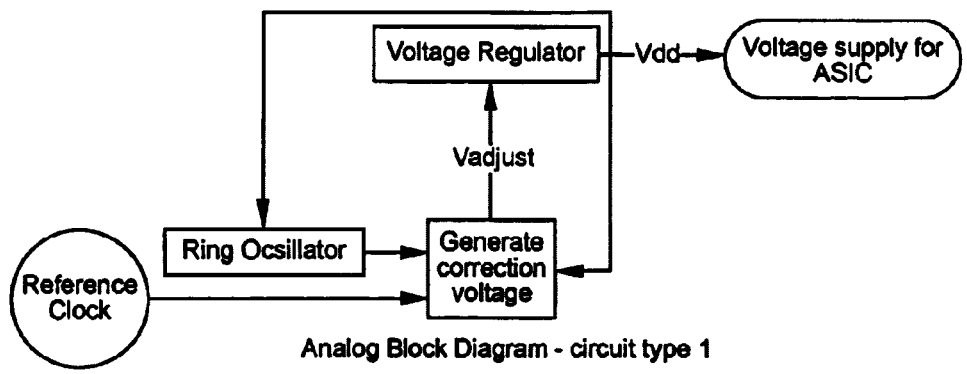
FIG. 5 is a high-level block diagram of one analog implementation of a regulation scheme in accordance with the present invention.
Figure 6:
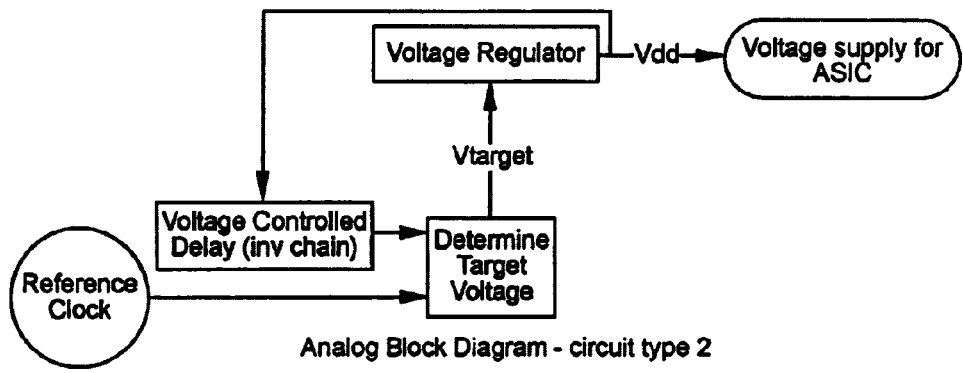
FIG. 6 is a high-level block diagram of another analog implementation of a regulation scheme in accordance with the present invention.

FIGS. 5 and 6 show additional alternative arrangements of embodiments of the present invention in which on-chip circuitry is provided for making measurements that are indicative of the speed performance of that chip and then communicating information to a voltage regulator that directs adjustment of the nominal output voltage of the voltage regulator, or directs the voltage regulator to achieve a particular output voltage. It is noted that whenever this disclosure refers to producing or providing a particular voltage, it should be understood that in addition to that particular voltage, such an expression also includes a range of voltages within a tolerable error range.

There are a wide variety of applications for embodiments of the present invention. In various embodiments of the present invention, voltage regulation control signals are produced on-chip in order to normalize device and circuit speed variations that occur between chips caused by variations in the chip manufacturing process. Similarly, such voltage regulation control signals are produced on-chip to normalize device and circuit speed variations that occur within a chip due to temperature variations during operation. In one illustrative embodiment, such voltage regulation control signals may be based, at least in part, upon a delay variation of an inverter chain as a function of supply voltage, using a comparison to a reference clock. In another illustrative embodiment, such voltage regulation control signals may be based, at least in part, upon a delay variation of a ring oscillator as a function of supply voltage, using a comparison to a reference clock.

In various embodiments of the present invention, a chip may be programmed, for example, using non-volatile memory, to normalize variations in device performance due to chip-to-chip variations in the manufacturing process. Such programming may be performed during a testing or characterization process that typically occurs after fabrication. Furthermore such programming may be achieved by means such as, but not limited to, laser, fuse, anti-fuse, flash memory, or volatile memory. Such programming would eliminate the need for a reference clock.

In various embodiments of the present invention, a voltage regulation control circuit is provided to adjust the output voltage of a voltage regulator in accordance with performance changes due to temperature variations. In still other embodiments of the present invention, back bias voltage (sometimes referred to as substrate bias) is regulated to normalize one or more device performance characteristics such as, but not limited to, threshold voltage and leakage current.

In some embodiments of the present invention, various components of a voltage regulator, which are not integrated within the integrated circuit that receives the voltage output of the regulator, are incorporated into, or integrated with, the package of that integrated circuit. This arrangement generally results in space savings.

In some embodiments of the present invention, the power supply voltage is adjusted from its nominal value so as to avoid deleterious effects, such as, but not limited to, hot carrier problems at high voltage, failure of interface circuitry connected to the voltage controlled circuitry, and exceeding minimum and/or maximum voltage stress limits of the circuitry receiving the controlled voltage supply.

In some embodiments of the present invention, an I/O supply voltage may be used as the source for core supply voltage regulation.

In some embodiments of the present invention, an on-chip speed regulated supply is provided such that specific functions are powered with regulated supply lines which may be shut down to conserve power, or supplied with different voltages for specific speed or power requirements.

In some embodiments of the present invention, an on-chip speed regulated supply is provided wherein the unregulated supply is distributed around the chip and regulated locally.

In some embodiments of the present invention, a method of testing an integrated circuit having an on-chip speed performance determination circuit coupled to a voltage regulator, includes monitoring the regulated voltage, and if the regulated voltage goes above or below a predetermined limit, rejecting the part as being too slow or too fast to successfully pass final electrical or timing tests. Such testing may be performed regardless of whether the integrated circuit is in wafer form, or packaged form.

Analog Voltage Regulator with Dual Feedback

Referring to FIG. 7, an illustrative embodiment 700 of the present invention is shown in schematic form. For convenience of description, illustrative embodiment 700 is divided into several blocks (each block delineated by a dotted line), including a PWM driver block 750, an inductor power saver block 760, and a dual feedback regulator control circuit 770. More particularly, illustrative embodiment 700 uses a buck converter with dual regulation feedback. The illustrative circuit of FIG. 7 has been designed to generate a 1.8 Volt chip supply voltage from a 3.3 Volt source. PWM driver 750, inductor 714, and 10 uF capacitor 718 circuits, which are illustrated in FIG. 7, are commonly used in these converters. Various methods similar to that illustrated in FIG. 7 by inductor power saver block 760, may be used to improve or optimize the use of the inductor power.

Still referring to FIG. 7, PWM driver block 750 includes a current source 702, an n-channel FET 704, a capacitor 706, a comparator 708, a D-type flip-flop 710 and a p-channel FET 712. Current source 702, a 12 μA source in this example, is connected to a node 703. N-channel FET 704 is coupled drain-to-source between node 703 and ground. Capacitor 706, having a capacitance of 4 pF in this example, is coupled between node 703 and ground. Node 703 is further coupled to a positive input terminal of comparator 708. The negative input terminal of comparator 708 is coupled to the output (labelled Vtrip) of a PID filter 730 as shown. The output terminal of comparator 708 is coupled to the Set input terminal of D-type flip-flop 710. The D input terminal and the Clock input terminal of flip-flop 710 are coupled respectively to the positive voltage supply node (i.e., positive rail), and a reference clock signal source (not shown). The Q output terminal of flip-flop 710 is coupled to a node 711. Node 711 is coupled to the gate electrode of n-channel FET 704, and is further coupled to the gate electrode of p-channel FET 712. P-channel FET 712 is coupled source-to-drain between the positive voltage supply node, and a node Vx.

Inductor power saver block 760 includes a comparator 736, a D-type flip-flop 738, an n-channel FET 740, and capacitor 716. N-channel FET 740 is coupled drain-to-source between node Vx and ground. Capacitor 716, having a capacitance of 10 nF in this example, is coupled between node Vx and ground. The negative input terminal of comparator 736 is coupled to node Vx. The positive input terminal of comparator 736 is coupled to a node 733 which is the output node of a voltage divider formed by the series connection of a 32 KΩ resistor 732 and a 1 KΩ resistor 734, the resistors 732, 734 being coupled between the positive supply voltage node and ground respectively. Those skilled in the art and having the benefit of this disclosure will appreciate that any suitable circuit arrangement for a voltage divider may be used. The output terminal of comparator 736 is coupled to the clock input terminal of flip-flop 738. The D input terminal and the Reset terminal of flip-flop 738 are coupled respectively to the positive voltage supply node and the reference clock signal source (not shown). The Q output terminal of flip-flop 738 is coupled to the gate electrode on n-channel FET 740.

Still referring to the illustrative example of FIG. 7, regulator dual feedback block 770 includes resistors 720, 722, a ring oscillator 724, a phase-detector/filter circuit 726, a summer 728, and a proportional-integral-differential (PID) filter 730. A node Vreg is coupled to a first terminal of a resistor 720, having a resistance of 10 KΩ in this example. Node Vreg is the voltage regulator output node. A second terminal of resistor 720 is coupled to a node FBnom. A resistor 722, having a resistance of 20 KΩ in this example, is coupled between node FBnom and ground. Node Vreg is also coupled to ring oscillator 724 so as to provide power thereto. An output terminal of ring oscillator 724 is coupled to a first input terminal (FBin) of phase-detector/filter circuit 726. A second input terminal (REFin) of phase-detector/filter circuit 726 is coupled to the reference clock signal source (not shown). An output terminal of phase-detector/filter circuit 726 is coupled to a first input terminal of summer 728. Node FBnom is coupled to a second input terminal of summer 728. An output terminal of summer 728 is coupled to an input terminal of PID filter 730. PID filters are well-known in this field and are not described in greater detail herein.

It is noted that phase-detector/filter circuit 726 is similar to a phase locked loop (PLL), however phase-detector/filter circuit 726 includes a phase-detector and low-pass filter but not the voltage controlled oscillator (VCO) which is conventionally part of a PLL. In this illustrative embodiment, phase-detector/filter circuit 726 generates a control voltage that is based upon the phase difference detected between the reference clock signal and the output of ring oscillator 724. The control voltage generated by phase-detector/filter circuit 726 is provided to summer 728 as described above. In a larger sense, the frequency of ring oscillator 724 is related to the control voltage generated by phase-detector/filter circuit 726, because that control voltage, in combination with the additional circuits and operations described above, affects the voltage at node Vreg, which, in turn, is coupled to the positive supply rail of ring oscillator 724 thereby affecting the frequency of ring oscillator 724.

Still referring to FIG. 7, an inductor 714, having an inductance of 2 nH in this example, has a first terminal coupled to node Vx, and a second terminal coupled to node Vreg, as shown in FIG. 7. A capacitor 718, having a capacitance of 10 μF in this example, is coupled between node Vreg and ground. In this illustrative example of the present invention, the regulated voltage, Vreg, is designed to stay within a minimum and maximum regulated range of about 1.5 to 2.1 volts by using a nominal feedback signal (Fbnom) summed with a feedback signal that is dependent on the frequency of ring oscillator 724. The frequency of ring oscillator 724 is dependent upon the voltage at node Vreg, i.e., the output of the voltage regulator.

In operation, the nominal feedback path of regulator dual feedback block 770, which attempts to keep Vreg at 1.8 volts in this example, has a fast response time to reduce, or minimize, mis-tracking of Vreg with changes in load current. The FBpll path tries to pull Vreg to compensate for delays in ring oscillator 724 which are faster or slower than a target value. This target value, or frequency, is chosen to result in the ring oscillator frequency matching, or substantially matching, the reference clock frequency when Vreg is at the maximum desired voltage (in this case 2.1 volts) with the temperature and process parameters being at their slowest expected values. Since a phase-detector/filter circuit, which is similar to a PLL, is being used, there is significant lag in the response of this path. The allowed range of operation for the FBpll path is rail to rail (i.e., 0 to 3.3 volts (nominal)), while the range for the FBnom path is approximately 1.0 volts to 1.4 volts (i.e., two thirds of the range for Vreg). When the FBsum voltage is greater than a bandgap voltage (1.2v nominal), Vtrip is reduced. This results in a shorter driven pulse width and therefore less current delivered to the output inductor and chip supply.

PWM Driver block 750 drives large p-channel FET 712 at the CKref frequency with variable pulse width. The pulse width is set to (4 pf*Vtrip/12 uA). The duty cycle is proportional to the current delivered. When p-channel FET 712 of PWM driver block 750, is turned off, the 2nH inductor continues to supply current to the load (i.e., 10 uf capacitor 718 and the chip supply). The voltage at node Vx will be dropping rapidly. When Vx drops below 0.1 volts, the power saver comparator 736 trips flip-flop 738 to drive the gate electrode of the large n-channel FET 740. This closes the current loop for inductor 714, allowing it to continue to deliver its energy to the load. The 10 nF capacitor 716 slows the rate of drop for Vx thereby allowing inductor power saver block 760 to turn on n-channel FET 740 before Vx drops significantly below ground. In an alternative arrangement, a diode with its anode at ground and cathode at Vx could be used in place of inductor power saver block 760. However the regulator efficiency would be reduced due to the power lost in the diode. With inductor power saver block 760, the power loss is limited by the drop across n-channel FET 740 when it is turned on (i.e., <0.1 v).

Additional On-Chip Measurements

It will be appreciated that any suitable process- or operation-dependent parameter, or characteristic, may be measured on-chip and used, at least in part, as the basis for commanding, or requesting, changes to the nominal voltage outputs of one or more regulated voltage supplies. For example, the current-drive of p-channel and n-channel FETs may be determined separately so as to further refine the decision making process regarding changes to the supply voltage. Similarly, the leakage of p-channel and n-channel FETs may be determined separately. Those skilled in the art and having the benefit of this disclosure will understand that many other measurements, including but not limited to, the resistivity of conductor materials, and the capacitance of various structures, may all be individually made, and these measurements factored into the generation of control signals that determine changes to the regulated output voltages. Such applications of the present invention are not precluded from use in integrated circuits such as microelectromechanical systems (MEMS), or in integrated circuit that include various light-emitting diodes or laser diodes.

Multiple Control Regime Alternative

In another embodiment of the present invention, on-chip detection of speed and leakage characteristics can be used to control two or more power supply voltages that are provided to that chip so as to achieve a blended, or hybrid, control regime, wherein both the positive supply rail and the substrate bias are adjusted to achieve a particular range of performance. For example, in a power savings mode, the positive supply rail may be reduced while the magnitude of the negative substrate bias for n-channel FETs is increased, thereby reducing the standby current consumption. To achieve this control regime, additional information is provided by either the chip receiving the regulated voltage, or by some external control circuitry, wherein the additional information is used to modify the voltage adjustment control signals produced in simpler embodiments of the present invention. In other words, the on-chip detection of speed and leakage characteristics can be used not just to obtain high speed performance from the chip, but to tune the chip performance in terms of both speed and leakage to any one of a plurality of performance ranges. In a further alternative embodiment, a mode register is included in the circuit block that produces voltage adjustment commands for the regulator. Such a mode register is programmed to contain the information necessary to allow the circuit block to generate a set of voltage adjustment commands consistent with the programmed mode. For example, to adjust the various supply voltages to achieve various goals such as maximum speed, or minimum power consumption, or one of a plurality of sets of speed and power trade-offs.

Degradation/Failure Detection

As described above, on-chip circuitry in accordance with the present invention detects performance variations of the chip, such as changes in speed of operation, and generates one or more control signals for adjusting the output voltage of a regulated power supply in order to achieve speed correction in the integrated circuit. In a further aspect of the present invention, knowledge of the amount of speed correction may be used to make a determination regarding the reliability, or changes in the reliability, of the integrated circuit. Using the speed correction information (i.e., the performance based control information generated on-chip and typically provided to the regulated power supply) a determination can be made that either the magnitude of change, or the rate of change over time, is such that maintenance is required, or that the chip should be replaced.

In one embodiment of the present invention, the on-chip circuitry for detecting speed of operation and generating voltage regulation control signals may be further coupled to additional circuitry which determines whether the amount of power supply voltage adjustment needed to compensate, or modify, the speed of operation of the integrated circuit, has exceeded a predetermined threshold. When the amount of adjustment exceeds such a threshold, a signal may be generated indicating that service should be provided to the system, or product, in which the integrated circuit is incorporated. The signal may be coupled to an output terminal of the integrated circuit so that the signal may be continuously monitored. Alternatively, the signal, which indicates excursions of the requested voltage adjustment beyond the predetermined threshold value, may be recorded, or stored, within the integrated circuit. This stored information may be accessed by means of JTAG circuitry, or any other suitable circuit arrangement. In a further alternative arrangement, either the voltage regulator control signals, or the signals indicating an excursion beyond the predetermined threshold may be stored in an off-chip voltage regulator, rather than within the integrated circuit that generated the control signals, and accessed from the off-chip voltage regulator by JTAG or any other suitable circuitry. In a still further embodiment, those signals may be stored and/or processed by a system management chip incorporated into the system or product, in which the integrated circuit is incorporated.

Field Programmable Gate Array Implementation

Various embodiments of the present invention may be implemented partially or completely as a field programmable gate array (FPGA). For example, in some embodiments a first circuit, such as a ring oscillator or delay chain, is implemented within an FPGA. In this exemplary embodiment, the first circuit is coupled to receive its power from a first voltage regulator, provide an output signal from which the speed and/or leakage characteristics thereof can be obtained, and that output signal is further processed to produce control information that affects the voltage output of the first voltage regulator.

Some or all aspects of the present invention may be implemented for FPGAs as a hard macro.

CONCLUSION

Embodiments of the present invention find application in electronic products in which one or more integrated circuits are provided with the output of regulated power supplies.

Various embodiments of the present invention provide means for on-chip determination of speed and/or leakage characteristics. Still other embodiments provides means for on-chip determination of the resistivity of conductors, or the capacitance per unit area of various capacitor structures. These on-chip measurements, or determinations of performance characteristics, are then used to generate one or more control signals for voltage regulation circuitry.

An advantage of some embodiments of the present invention includes compensating for performance variations due to manufacturing variations and/or operating temperature conditions, by adjusting the voltage output of a voltage regulator.

A further advantage of some embodiments of the present invention includes determining and reporting reliability degradation due to drift in performance characteristics.

It is noted that many alternative embodiments in accordance with the present invention are possible. For example, an internal control scheme which uses a non-linear propagation delay comprised of T1, followed by T2. If a propagated edge has reached the output of T1 before a fixed reference time, then the T2 delay is increased by a multiplier, K. Such an arrangement allows tighter Vdd lock without hard limits.

It is to be understood that the present invention is not limited to the embodiments described above, but encompasses any and all embodiments within the scope of the subjoined claims.

What is claimed is:

1. An apparatus, comprising:
   a first circuit, disposed within an integrated circuit, the first circuit having a first positive supply rail coupled to an output terminal of a regulated power supply, the first circuit having at least one operating characteristic that is dependent upon the magnitude of a voltage that is supplied at the output terminal of the regulated power supply, the first circuit operable to provide a first signal indicative of the at least one operating characteristic at a first output terminal; and
   a second circuit coupled to the first output terminal of the first circuit, the second circuit adapted to receive a reference clock signal, the second circuit further adapted to compare the first signal and the reference clock signal and to provide a control signal for controlling the magnitude of the voltage that is supplied at the output terminal of the regulated power supply;
   wherein the regulated power supply, responsive to the second signal, increases or decreases the magnitude of the voltage that is supplied at the output terminal of the regulated power supply, such that at least one operating characteristic of the first circuit is modified to be within a predetermined range; and
   wherein the regulated power supply is disposed external to the integrated circuit, the integrated circuit includes circuitry, disposed in the integrated circuit, in addition to the first and second circuits, and the output terminal of the regulated power supply is further coupled to supply power to the additional circuitry.

2. The apparatus of claim 1, wherein the first circuit comprises an inverter chain.

3. The apparatus of claim 1, wherein the first circuit comprises a ring oscillator.

4. The apparatus of claim 1, wherein the second circuit is disposed within the integrated circuit.

5. The apparatus of claim 1, wherein the at least one operating characteristic of the first circuit is leakage current.

6. The apparatus of claim 1, wherein the integrated circuit is a field programmable gate array.

* * * * *